ID

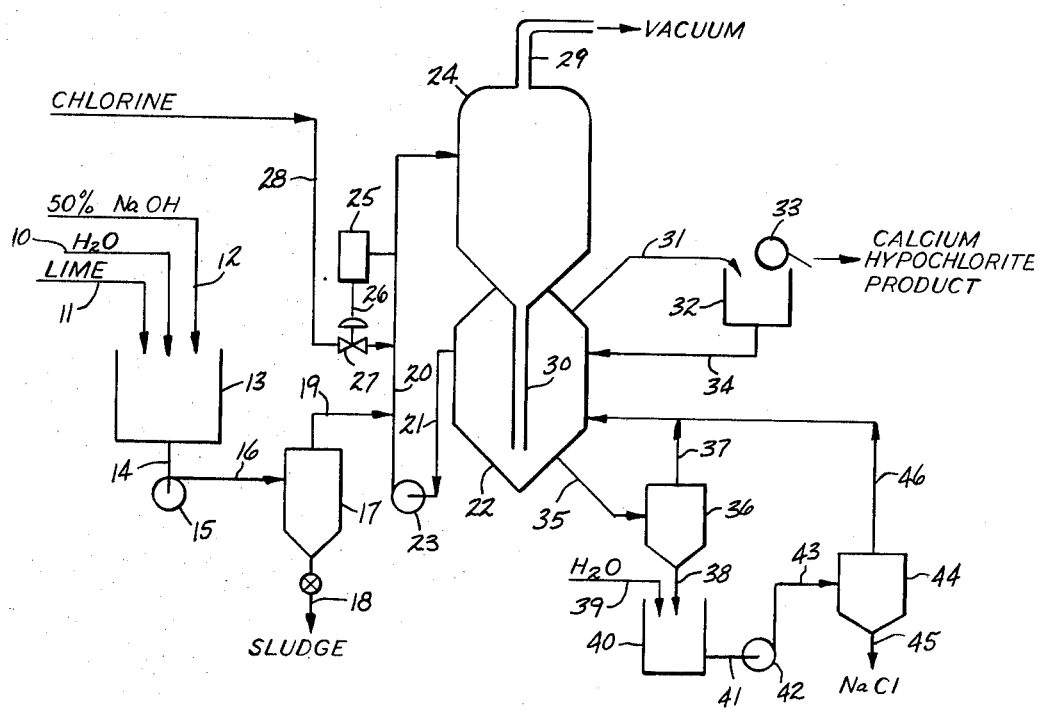

United States Patent Office 3,251,647
Patented May 17, 1966

3,251,647
PROCESS FOR PRODUCING CALCIUM HYPO-
CHLORITE OF HIGH PURITY AND AVAILABLE
CHLORINE CONTENT
Bernard H. Nicolaisen, Stamford, Conn., assignor to Olin
Mathieson Chemical Corporation, a corporation of
Virginia
Filed June 15, 1964, Ser. No. 375,225
4 Claims. (Cl. 23—86)

This invention relates to the manufacture of calcium hypochlorite by an improved process having the advantage of producing calcium hypochlorite of exceptionally high purity and available chlorine content and the further advantage of producing no waste liquors containing unrecoverable hypochlorite which are usually disposed of as "bleach liquor" at distress prices.

Calcium hypochlorite enjoys a major portion of the market for available chlorine compounds, aside from chlorine itself, because it is the cheapest and most stable solid composition known which delivers all of its available chlorine immediately on contact with oxidizable materials. Calcium hypochlorite compositions containing at least 70 percent of available chlorine have been on the market for many years, for example, under the trademark "HTH."

A variety of processes and modifications are known in the art of manufacturing calcium hypochlorite, all directed to producing the best quality material, free of deleterious concomitants and diluents at the lowest possible cost. In the chlorination of lime to produce calcium hypochlorite, equimolar proportions of calcium chloride are formed. Calcium chloride in the finished product is extremely deleterious to stability and must be kept to a minimum. It can be reduced to tolerable limits by treating the calcium hypochlorite in a late stage of manufacture with sodium hypochlorite, converting the calcium chloride to calcium hypochlorite and sodium chloride. Better, according to U.S. Patent 1,718,284, mixed alkalies (lime and caustic) are chlorinated, in effect, all the calcium being converted to hypochlorite and all of the caustic to salt. Since the operation is carried out in a eutectic aqueous solution (saturated with both salt and $Ca(OCl)_2$), all of the newly formed salt and $Ca(OCl)_2$ in each cycle is precipitated and removed as mixed product. This mixture of 2 moles of NaCl per mole of $Ca(OCl)_2$ can at most contain 55 percent of the latter and, while stable, it is not competitive with commercial 70 percent calcium hypochlorite. The eutectic liquor separated from the precipitate is suitable for recycle but any attempt to increase the hypochlorite content of the cake by washing out the salt creates a bleach liquor containing salt and hypochlorite values considerably below their saturation limits. The liquor hence cannot be recycled but must be disposed of without profit.

The same patent suggests that there is a 10 minute interval after chlorine is introduced until the newly formed salt is crystallized out but the calcium hypochlorite remains in supersaturated solution. If the clear liquor is decanted from the salt during this period, the calcium hypochlorite which subsequently crystallizes is relatively free from salt. However, the patent is silent on the yield or purity of the product thus obtained. The hazard of depending on maintaining a solution supersaturated during a filtration or other separation on a commercial scale is obvious. In a calcium hypochlorite plant, accidental seeding is very probable. The resulting uncontrolled crystallization with sudden evolution of heat is intolerable in a commercial process besides defeating the purpose of this uncertain operation.

Alternatively the salt content of the calcium hypochlorite may be reduced as further described in the same patent by chlorinating strong caustic, separating precipitated salt and adding the resulting sodium hypochlorite and lime to the eutectic solution, chlorinating the lime in the resulting slurry and filtering off the precipitated calcium hypochlorite. The yield and purity of the product of this operation is not described. However, it does introduce additional operations into the process, namely the chlorination of caustic and separation of sodium chloride.

The process of the present invention obviates the difficulties of the prior art by providing an equilibrium process as contrasted with a metastable process; it involves a single chlorination step in contrast to plural chlorinations; it requires only a single separation in contrast to plural separation operations and it produces high test calcium hypochlorite competitive in the market. In a further modification, calcium hypochlorite can be produced which has higher available chlorine content than has previously been commercially available.

The process of the present invention consists in introducing chlorine into a first slurry of lime and recycle calcium hypochlorite suspended in a mixture of aqueous caustic soda and recycle liquor to form a chlorinated first slurry, transferring the resulting chlorinated first slurry in sequence to an evacuated evaporating zone and then to a classifying zone, maintaining calcium hypochlorite crystals in suspension in the liquor present in the upper portion of said classifying zone, removing from the upper portion of said classifying zone a second slurry in which the solid phase is predominantly calcium hypochlorite, separating said second slurry into calcium hypochlorite and a first remaining liquor and recycling said first remaining liquor to said classifying zone, maintaining a bed of sodium chloride crystals in the lower portion of said classifying zone, removing from the lower portion of said classifying zone a third slurry in which the solid phase is predominantly sodium chloride, separating said third slurry into sodium chloride and a second remaining liquor and recycling said second remaining liquor to said classifying zone, removing a fourth slurry from said classifying zone at a point between said upper portion and said lower portion of said classifying zone and recycling said fourth slurry to said evaporating zone.

According to the present invention, sodium chloride crystals are grown in the cubic system in an equilibrium process to substantial size, suitably from 0.05 to 0.15 inch on an edge. These crystals have a high ratio of weight to surface. In contrast calcium hypochlorite is grown in platelets with a high surface-to-weight ratio. Because of agitation in the system, the calcium hypochlorite crystals cannot grow larger than about 0.1 inch in their longest dimension. Since these two kinds of crystals have markedly different habits and densities, they are readily separated in a classifying crystallizer. A bed of well-crystallized sodium chloride crystals is established and maintained in the lower portion of the classifying zone and the co-precipitated calcium hypochlorite platelets are maintained in suspension in the liquor in the upper part of the classifying zone.

The chlorine is introduced as liquid or gas. Advantageously the molar ratio of caustic soda to lime introduced is substantially 2:1 but a variation of about 5 percent from this ratio is tolerable. Appropriately the vacuum evaporating zone is connected to the classifying zone through a barometric leg.

FIGURE 1 shows a flow sheet of the process of this invention. Lime is introduced via line 11 and 50 percent aqueous caustic soda is introduced via line 12 into mixing tank 13. Additional water can be introduced via line 10. The resulting slurry is transferred via line 14, pump 15 and line 16 to liquid cyclone 17 from which sludge may be withdrawn via valved line 18. The suspension of mixed alkalies is transferred via line 19 to line 20 where it is mixed with recycle reaction mixture removed via line 21 from classifier 22. Pump 23 transfers the mixture of fresh mixed alkalies and recycle reaction mixture via line 20 to vacuum chamber 24. In line 20, pH recorder-controller 25 samples the flow, and via line 26 controls the introduction of chlorine by means of valve 27 in line 28. A vacuum is produced in any suitable manner in vacuum chamber 24, line 29 connecting the vacuum chamber 24 with the vacuum system. The reaction mixture in vacuum chamber 24 passes through barometric leg 30 into classifier 22 where the mixture is maintained in relatively quiescent state. However, introduction and withdrawal of recycle and product streams maintain agitation suspending the calcium hypochlorite platelets in the liquor in the upper part of classifier 22 and allowing the sodium chloride crystals to settle to the bottom of chamber 22. From the top of classifier 22 a slurry, the solid phase of which consists predominantly of calcium hypochlorite, is removed via line 31 to filter tank 32 and filter 33 from which the calcium hypochlorite product is removed. The filtrate is transferred via line 34 to classifier 22. From the lower section of classifier 22 a slurry whose solid phase consists predominantly of sodium chloride is removed via line 35 to liquid cyclone 36. Supernatant liquor is returned via line 37 to classifier 22. Settled sodium chloride crystals are removed via line 38 from the bottom of liquid cyclone 36, mixed with a small proportion of water added via line 39 in mixing tank 40. The slurry with the sodium chloride crystals is transferred via line 41, pump 42 and line 43 to liquid cyclone 44. The crystals of sodium chloride are removed via line 45 and the wash liquor is returned via line 46 to classifier 22.

*Example I*

Using apparatus substantially as shown in FIGURE 1, lime containing 96 percent CaO was introduced at a rate of 625 grams per hour into the mixing tank together with 1370 grams per hour of 50 percent aqueous caustic and 1000 grams per hour of water. The resulting suspension was continuously pumped into a mixing line and there mixed with 1600 milliliters per hour of reaction liquor pumped from the mid-point of the classifier. Chlorine was introduced at a rate of 1210 grams per hour into the flowing stream. The mixture was passed into the evaporator and thence into the classifier. The liquor containing suspended calcium hypochlorite, was pumped from the upper portion of the settling chamber to the filter. The filtrate was pumped back to the classifier. Wet calcium hypochlorite cake was removed from the filter at a rate of 2213 grams per hour. The cake contained 1130 parts of calcium hypochlorite, 173 parts of sodium chloride and 910 parts of water. When the cake was dried, suffering a 10 percent loss of available chlorine, a calcium hypochlorite product was obtained which contained 76.5 percent available chlorine. A sludge, containing solid sodium chloride crystals, was pumped from the lower portion of the classifier to a liquid cyclone to produce wet crystals at a rate of 1042 grams per hour. The crystals contained 827 parts of sodium chloride, 30 parts of calcium hypochlorite and 185 parts of water. The residual liquor and washings were pumped back to the classifier.

What is claimed is:

1. The process of preparing calcium hypochlorite compositions by introducing chlorine into a first slurry of lime and recycle calcium hypochlorite suspended in a mixture of aqueous caustic soda and recycle liquor to form a chlorinated first slurry, transferring the resulting chlorinated first slurry in sequence to an evacuated evaporating zone and then to a classifying zone, maintaining calcium hypochlorite crystals in suspension in the liquor present in the upper portion of said classifying zone, removing from the upper portion of said classifying zone a second slurry in which the solid phase is predominantly calcium hypochlorite, separating said second slurry into calcium hypochlorite and a first remaining liquor and recycling said first remaining liquor to said classifying zone, maintaining a bed of sodium chloride crystals in the lower portion of said classifying zone, removing from the lower portion of said classifying zone a third slurry in which the solid phase is predominantly sodium chloride, separating said third slurry into sodium chloride and a second remaining liquor and recycling said second remaining liquor to said classifying zone, removing a fourth slurry from said classifying zone at a point between said upper portion and said lower portion of said classifying zone and recycling said fourth slurry to said evaporating zone.

2. Process of claim 1 in which the molar ratio of lime to caustic soda in said suspension of lime in aqueous caustic soda is substantially 1:2.

3. Process of claim 1 in which gaseous chlorine is introduced.

4. Process of claim 1 in which liquid chlorine is introduced.

No references cited.

BENJAMIN HENKIN, *Primary Examiner.*

E. STERN, *Assistant Examiner.*